No. 11,912. Reissued June 4, 1901.

P. G. EMERY.

FIXTURE FOR WINDOW CURTAINS OR SHADES.

(Application filed Apr. 15, 1901.)

2 Sheets—Sheet 1.

WITNESSES:

H. E. Montague

Calvin J. Mellen

INVENTOR

Plato G. Emery

BY R. S. Bacon

Attorney

No. 11,912. Reissued June 4, 1901.
P. G. EMERY.
FIXTURE FOR WINDOW CURTAINS OR SHADES.
(Application filed Apr. 15, 1901.)
2 Sheets—Sheet 2.
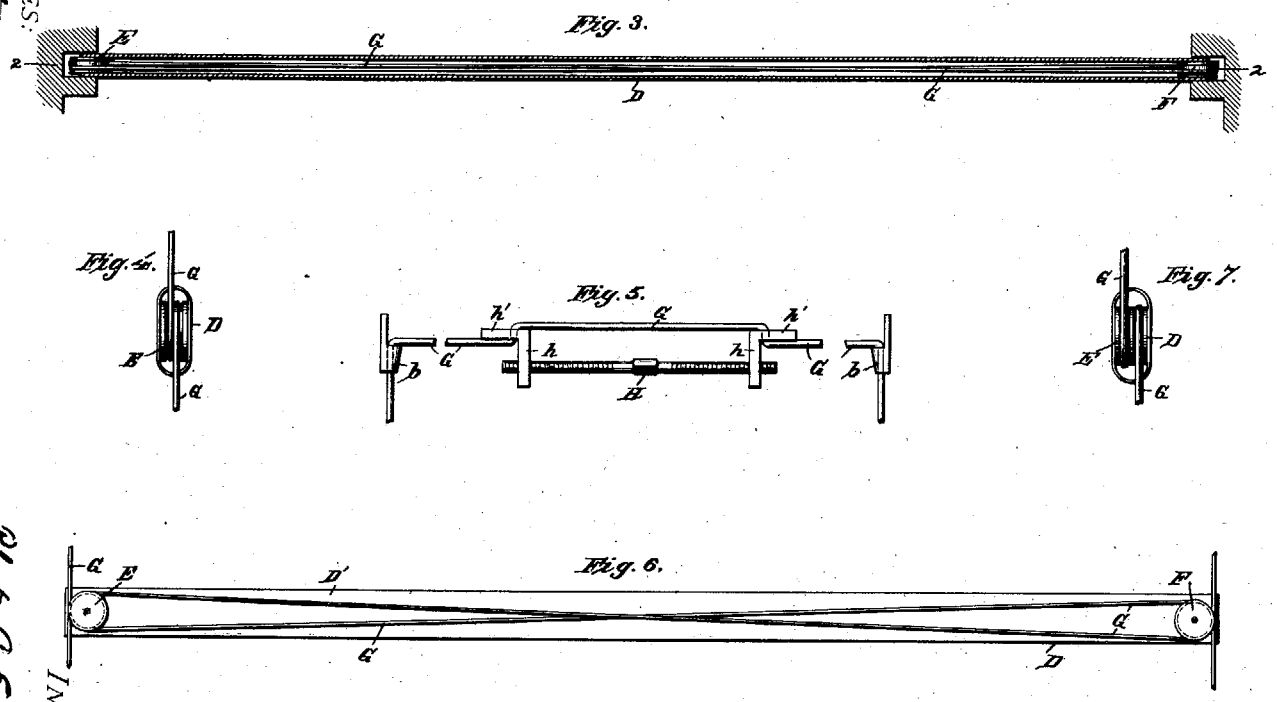
WITNESSES:
H. E. Montague
Calvin T. Wilkins
INVENTOR
Plato G. Emery
BY
C. S. Bacon
Attorney

UNITED STATES PATENT OFFICE.

PLATO G. EMERY, OF CHICAGO, ILLINOIS, ASSIGNOR, BY MESNE ASSIGNMENTS, TO THE CURTAIN SUPPLY COMPANY, OF NEW JERSEY.

FIXTURE FOR WINDOW CURTAINS OR SHADES.

SPECIFICATION forming part of Reissued Letters Patent No. 11,912, dated June 4, 1901.

Original No. 560,133, dated May 12, 1896. Application for reissue filed April 15, 1901. Serial No. 56,003.

*To all whom it may concern:*

Be it known that I, PLATO G. EMERY, of Chicago, in the county of Cook and State of Illinois, have invented certain new and useful Improvements in Fixtures for Window Curtains or Shades, of which the following is a specification, reference being had to the accompanying drawings and to the letters of reference marked thereon.

My invention relates to improvements in fixtures for window curtains or shades, more especially such as are used on railway-cars, the object being to provide a cheap, simple, and effective device whereby the curtain or shade may be raised or lowered and retained in any position, this being done by simply raising or lowering with the hand the rod usually attached to the bottom of the curtain or shade. This object and others I attain by means of the arrangement of parts shown in the accompanying drawings, in which—

Figure 1:
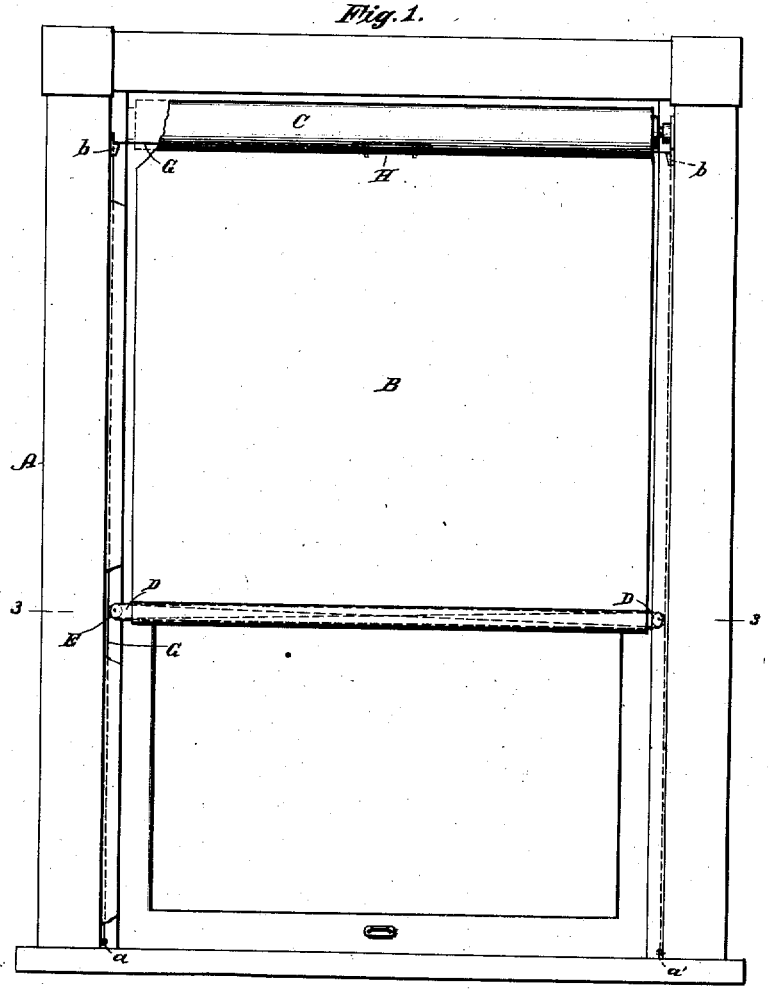
Figure 2:
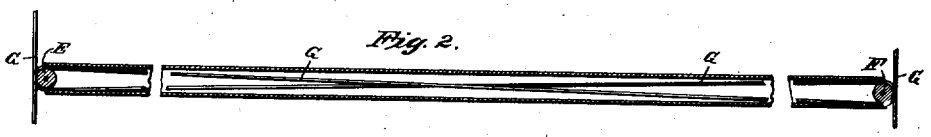

Figure 1 is an elevation of the inner side of a car-window having my invention attached. Fig. 2 is a sectional view of the lower end of the curtain on an enlarged scale, the section being taken on the line 2 2. Fig. 3 is a longitudinal section on the line 3 3. Fig. 4 is an end view of the lower end of the curtain. Fig. 5 is a view of a detail; and Figs. 6 and 7 show modifications.

Similar letters of reference indicate similar parts in the respective figures.

Referring to the drawings, A represents a window-frame provided with sash in the usual manner, in front of which is hung the curtain or shade B from a spring-roller C, which turns in bearings mounted at the sides of the window-frame near the top in the ordinary manner. The spring-roller C differs from those in common use in that it is not provided with stops, the tendency therefore being to keep the shade constantly rolled up.

To the bottom of the shade B is secured a hollow rod D, lying in a horizontal position, within each end of which is a pulley E or F. The pulleys may, however, be double, as seen in Fig. 7, or omitted altogether.

A cord, chain, or wire G, secured to the bottom of the window-frame at one side, as at *a*, extends upward to the pulley E, the said pulley being journaled in one end of the hollow rod D, over which it is carried. Thence it passes through the hollow rod D to the opposite pulley F. Passing downwardly under this pulley it again extends upwardly on this side of the window to the top of the window-frame, where it is threaded through a loop *b*. From this point it runs in a horizontal direction behind the spring-roller C to a similar loop *b* on the opposite side of the window, through it and downwardly to and under the pulley E in the hollow rod D, through which rod it again passes, crossing the part of the cord first introduced to the top of the pulley F, and thence over the said pulley and down to the bottom of the window-frame, where it is secured at *a'*. It will be seen that by this arrangement the shade may be raised or lowered to any desired position and there retained, it being understood that the tension of the spring-roller is insufficient to overcome the friction of the cord, but great enough to roll up the curtain as it is raised. The cord will prevent any side movement of the shade, and by the peculiar manner of arranging it the bottom rod of the shade will be retained at all times in a position parallel to the roller C, thus avoiding the irregular winding usually found in spring-rollers employed at the present time. I do not confine myself to the use of a cord, as I may in some cases use a chain or wire therefor.

It it well known that all flexible material will after use and wear stretch more or less. To overcome this defect, which would render the operation of my device less effective, I provide a take-up coupling. (Shown at H, Fig. 1, and in detail in Fig. 5.) As shown, it consists of two right-angled plates *h h*, through the horizontal members *h'* of which the cord G passes, as seen in Fig. 5. The vertical members of said plates are connected by a right and left threaded screw I. As the cord G stretches by wear the screw I, on being turned, will draw the plates *h h* more closely together, thereby taking up all slack in the cord. The take-up device may, however, be dispensed with, for while the device described is a convenient means for taking up the slack it is evident that the same result may be obtained by detaching one of the ends of the cord where fastened below, as at *a*, and tightening the cord and again securing it at that point. The ends of the hollow rod D will preferably run in grooves in the sides of the window-frame, within which the cord will also lie. The spring-roller will cover the take-up coupling, thus concealing it from view from the interior of the car.

In Fig. 6 I have shown a flat rod D′ as a substitute for the hollow rod D. In this case I secure the pulleys E F on one side of the rod instead of within the ends, as above described, this arrangement being cheaper and simpler, while not, however, presenting as neat an appearance as the preferred form.

It will be seen that by supporting the cord, chain, or wire by a loop at each upper corner of the window-frame the cord is free to be drawn through the loops when it is desired to tighten it. Thus by unfastening one of the ends of the cord at a lower corner of the window-frame and drawing on the cord it will slip through both loops and under and over the pulleys until the desired tension is obtained, when it may be again secured at the point from which it was detached. It is evident that this simple and convenient mode of tightening the cord is not available if the upper corner-supports of the cord are not in the form of loops or their equivalent, which will allow of the slip mentioned.

Having thus described my invention, I claim—

1. In a curtain-fixture, a window-frame and a spring-operated curtain secured thereto, and having a lower rod carrying at each end a pulley, combined with a single cord supported in a loop at each upper corner of the window-frame and secured thereto at each lower corner, passing over and around each of said pulleys, and crossing centrally of the said lower rod, substantially as set forth.

2. In a curtain-fixture, the combination with a window-frame, of a curtain or shade, a spring-roller secured to the upper end of said shade, a rod secured to the lower end thereof, cord-guides attached to the ends of the rod, and a single cord supported by a loop at each upper corner of the window-frame and extending across the top of the window-frame down the sides thereof to and longitudinally of the said rod, passing under and over the cord-guides thereon to the opposite ends of said rod, and then down the sides of the window-frame to the bottom thereof, where the ends of said cord are secured, substantially as shown and described.

3. In a curtain-fixture, the combination with a window-frame and a curtain or shade having a spring-roller, of a hollow rod at the bottom of the curtain, a pulley mounted at each end of said rod, loops at the upper corner of the window-frame, and a single cord crossing the top of the window-frame to the loops, and passing downwardly therefrom, on each side, to and through the hollow rod to the opposite side, under and over the said pulleys, and again downwardly to the bottom corners of the window-frame, where the ends of the cord are secured, substantially as shown and described.

4. In a curtain-fixture, a window-frame and a spring-operated curtain secured thereto, and having a lower rod carrying at each end a pulley, combined with a single cord supported at each upper corner of the window-frame and secured thereto at each lower corner, passing over and around each of said pulleys, and crossing centrally of the said lower rod, and a take-up device in said cord, substantially as set forth.

5. In a curtain-fixture, a window-frame and a spring-operated curtain secured thereto and having a lower rod carrying at each end a pulley, combined with a single guiding and retaining cord extending from the frame to the curtain and passing over or around the pulleys of said rod, and a take-up device in said cord, substantially as set forth.

6. In combination with a window-frame, a curtain, means for exerting an upward-lifting action thereon, a hollow rod, a pulley at each end thereof, loops at each side of the window-frame, a single cord extending horizontally across the window-frame to the loops and thence through the hollow rod to the diagonally opposite corners of the window-frame, and a take-up device secured to the cord to take up slack therein, substantially as shown and described.

7. The combination with a window-frame having grooves in its sides, of a flexible curtain, means exerting a constant upward-lifting action upon the curtain, a hollow rod carried by the lower end of the curtain and having its ends extending into the grooves of the frame, loops secured to the frame at opposite corners, a single cord extending along the frame and passing loosely through the loops and thence through the hollow rod to the opposite corners of the window-frame, and means for securing the ends of the cord to the frame at points opposite the loops, so that as the cord is drawn in one direction a uniform tension may be secured throughout and maintained by the said means, substantially as set forth.

8. The combination with a window-frame having grooves in its sides, of a flexible curtain, means for exerting a constant upward-lifting action upon the curtain, a hollow rod carried by the lower end of the curtain and having its ends extending into the grooves of the frame, loops secured to the frame at opposite corners, a single cord extending along the frame and passing loosely through the loops and thence through the hollow rod to the opposite corners of the window-frame, means for securing the ends of the cord to the frame at points opposite the loops, so that as the cord is drawn in one direction a uniform tension may be secured throughout and maintained by the said means, and a take-up device in said cord, substantially as set forth.

In testimony whereof I hereto set my hand this 26th day of March, 1901.

PLATO G. EMERY.

Witnesses:
EDGAR ANDREWS,
CHARLES F. PIKE.